Figure 1:
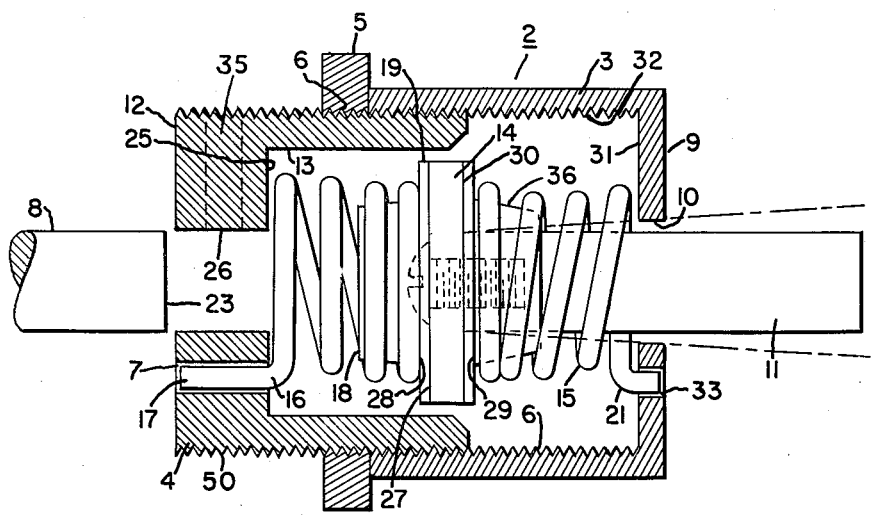

July 11, 1961  E. E. LOCHOW  2,991,637
COMBINATION CLUTCH AND COUPLING
Filed Jan. 31, 1958

INVENTOR:
ELMER E. LOCHOW,
BY Joseph P. Kates
HIS ATTORNEY.

United States Patent Office 2,991,637
Patented July 11, 1961

2,991,637
COMBINATION CLUTCH AND COUPLING
Elmer E. Lochow, Liverpool, N.Y., assignor to General Electric Company, a corporation of New York
Filed Jan. 31, 1958, Ser. No. 712,370
10 Claims. (Cl. 64—30)

The present invention relates to a combination clutch and coupling and more particularly relates to a combination clutch and flexible shaft-coupling especially useful in mechanical transmission between a fractional horsepower motor and a load shaft.

Prior art devices effected clutch coupling and modes of power transmission in various ways. In some cases wobbler type of mechanical or electromechanical couplings have been provided which may allow shaft displacement. Some latitude in deviation from axis of a shaft or rod has been provided in cases where the shaft itself does not rotate as, for example, in the use of a floating reamer in lathe applications wherein the reamer may be held loosely to provide for some deviation from true center axis or in certain cases pivotal or ball bearing mounting at one end and use of hydraulic transmission and of universal joints for flexibility of power transmission has been effected. However, prior art devices did not present a combined clutch and coupler which can be operated efficiently with positive one to one or other predetermined ratio coupling wherein shaft disalignment must be allowed for. An example of a prior art clutch coupling is shown in U.S. Patent No. 2,777,103 to A. E. Reed, issued January 8, 1957 for "Drift Stabilized Velocity Servo." This device comprises a servo mechanism arrangement which includes as one of its elements a clutch coupling consisting of a spring loaded clutch face attached to one shaft flange and pressed against a clutch face attached to the other shaft. However, devices of this nature allow no possibility for shaft disalignment. Other prior art devices have additional disadvantages such as absence of positive coupling, danger of impairment or breakage of the device because of the disalignment and unreliability in operation because of the the failure to insure positive clutching at all desired periods of operation. Also in prior art coupling devices rapid deterioration and wear of parts resulted, which where some off-axis deviation occurred forced use of parts made of material other than metal because of the types of stress, strain, friction and wear to which they were subjected.

The present invention overcomes these and other disadvantages of the devices of the prior art and in addition provides a clutch and a coupler which can be operated with as much as 15° shaft disalignment without seriously affecting the accuracy or efficiency of power transmission. The present invention not only provides for accurate positive direct coupling where necessary or desirable as in the case of fractional horsepower motors or certain servo mechanisms and syncro type operations and is not only adaptable for use with systems such as analogue computers, mechanical and electromechanical transmission systems and for indexing devices but in addition provides a reliable, sturdy and inexpensive yet simple apparatus for providing for direct coupling. The inventive device herein disclosed also lends itself readily to economical methods of manufacture and fabrication. In addition, use of parts wherein close tolerances are required is avoided by the apparatus of the present invention.

Accordingly, an object of the present invention is to provide an improved combination clutch and flexible shaft coupling.

Another purpose of the present invention is to provide a combination clutch and flexible shaft coupling which will be especially adaptable for use with apparatus such as servo mechanisms, analogue computers, and for coupling motors such as fractional horsepower motors to an output load shaft.

Another aim of the present invention is to provide for a mechanical transmission mechanism between a driving shaft and a driven shaft wherein the driven shaft can be operated with as much as 15° shaft disalignment without impairing the effectiveness of transmission.

Another object of the present invention is to provide a clutch and coupler device between an input and an output shaft and which can be operated despite considerable shaft misalignment and wherein the coupler housing may be firmly secured to the input shaft and contain a spring and clutch assembly to permit a prescribed amount of disalignment in the output shaft or vice versa.

Still another object of the present invention is to provide a clutch and coupler mechanism especially adaptable for fractional horsepower motors and which can be operated with a predetermined degree of shaft disalignment and wherein a coupler housing which may be firmly fastened to a motor shaft may extend so as to enclose the clutch and a portion of an output shaft and wherein a pair of springs retained inside the housing can exert a constant and opposed pressure on the flanges of a pair of clutch washers so as to retain the clutch disc between the flanges and retain the springs in proper alignment.

Another purpose of the present invention is to provide a clutch between a fractional horsepower motor and a load carrying shaft wherein the clutch will operate effectively even though the shafts may be misaligned.

Another aim of the present invention is to provide a clutch mechanism between a motor shaft and a load shaft wherein rotation will be transmitted from motor to load even though the shafts are misaligned and which will comprise a small enclosed unit which may be fabricated as a packaged unit with one end fitted onto the output shaft which protrudes therefrom, the output shaft being retained in position by internal springs and the other end being bearingly fit over a motor shaft and secured thereto, the springs also providing tension on clutch facings such that the output shaft can deviate from its true axis and form an angle with the axis of the motor shaft without materially effecting the action of the clutch.

Another purpose of the present invention is to provide a clutch device between a motor and load carrying shaft which will operate even though the output shaft deviates from its true axis to form an angle with the axis of the motor shaft and which will be adaptable to a system such as an automatic program control system for driving a mechanism such as a take-up reel in a paper punch mechanism to maintain a constant tension on the paper tape.

Figure 2:
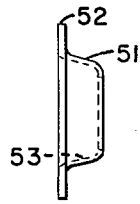
Figure 3:
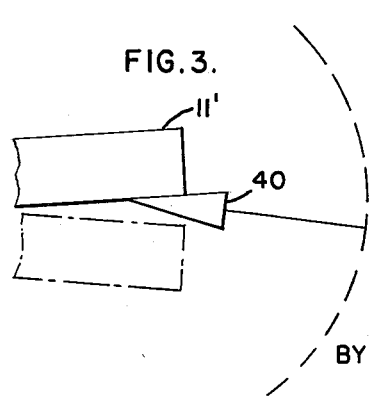
Figure 4:
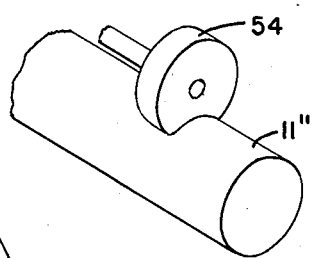

While the novel and distinctive features of the invention are particularly pointed out in the appended claims, a more expository treatment of the invention, in principle and in detail, together with additional objects and advantages thereof, is afforded by the following description and accompanying drawings in which:

FIG. 1 of the drawings presents a representation partially in cross-section showing a preferred embodiment of the mechanism of the present invention;

FIG. 2 is a side-elevational view of the special washer for the device of FIG. 1;

FIG. 3 is a side-elevational view of a portion of an output shaft similar to that shown in the device of FIG. 1 and showing an application wherein the apparatus includes conical means to cause constant conical scanning of the rotating output shaft; and FIG. 4 is a side-elevational view of an output shaft similar to that shown in the device of FIG. 1 and showing an application wherein the device includes a cam member to cause interrupted predetermined deviation from axis of the output shaft.

The illustrative embodiment of the present invention provides a clutch between a fractional horsepower motor or other power device having an input shaft and a load carrying shaft wherein the clutch may be disposed between the shafts to operate even though the shafts may be misaligned. Broadly, the inventive apparatus may comprise a small, totally enclosed unit that may be fastened to the motor shaft with set screws or other securing means, and the output shaft may protrude from the end opposite the end of the unit secured to the motor shaft. The output shaft may be held in position by an internal spring which also provides tension on a clutch facing such that the output shaft can deviate from its true axis and form an angle with the axis of the motor shaft without materially affecting the action of the clutch. An example of an operative embodiment of the inventive device is the clutch included in the General Electric 4BC16A1 Automatic Program Control System, which functions to drive a take-up reel, in a paper punch mechanism to keep constant tension on the paper tape. In the inventive device two springs inside a housing and fastened thereto may exert a constant and opposed pressure on flanges of washers so as to retain a clutch disc between the two washers.

Referring now to the figures of the drawings and in particular to FIG. 1, a clutch body or shell or housing generally designated at 2 may comprise two barrels 3 and 4, one of which barrels may be threaded into the other by means of mating threaded surfaces 50 and 6. Thus, as shown barrel 3 may be a female barrel and barrel 4 a male barrel. It will be understood that many other types of engagement for the two barrels may be readily effected, for example, sweating or force fitting one barrel into the other may be utilized for a permanent nonadjustable unit or a sliding fit could be introduced with set screws, rivets or other retaining means holding the two barrels in opposed inner facial relationship. In the embodiment shown whereby one barrel 3 is threaded into barrel 4, a lock nut 5 may be provided to hold the two barrels in predetermined or adjusted assembled position. Lock nut 5 may also be threaded internally on the inner bearing surface to present threaded aperture 6 which may be sized for that purpose. Barrel 4 may be apertured as by drilling, forging, precision casting, or casting or in other well known machine or other processes to provide an aperture 26 to receive the motor shaft 8 and a larger counter bore 13 to permit the clutch and spring assembly hereinafter described to be retained therein. Motor shaft 8 may be axially aligned with respect to aperture 26 in barrel 4 and retained therein by a set screw or other retaining means (not numbered) disposed in aperture 35 which may extend normal to barrel 4 and from its outer diameter into aperture 26. Barrel 3 may be in the shape of a cylinder having a closed end 9. Closed end 9 of barrel 3 may have machined or otherwise formed and axially extending therethrough an aperture 10 through which may be disposed the output shaft 11 in approximately axial relationship thereto. Aperture 10 may be of a size compared with the outer diameter of the output shaft 11 such that output shaft 11 may have sufficient play to deviate a predetermined amount in any direction off axis and could therefore be retained permanently or temporarily in angular relationship to the axis of aperture 10 by the cone of FIG. 3 or the cam of FIG. 4. An example of a predetermined amount in an operative embodiment is a total swing of 15° off the axis normal to the barrel 3 and its aperture 10. Barrel 4 may be closed at one end as described above and may be counter bored as shown at 13 and barrel 3 may have counter bore 32 so that the space between the face 25 of barrel 4 and face 31 of barrel 3 within the assembled barrel members may permit retention of a portion of the motor shaft 8 and of the output shaft 11, of a clutch disc 14, of washers 18 and 36, and of springs 15 and 16 in the clutch and flexible shaft coupling of the invention. A barrel aperture 33 and a barrel aperture 7 may be provided in barrels 3 and 4 respectively to position and retain respective ends of the tension springs 15 and 16. Retention springs 15 and 16 may be helical or coil springs having the outer ends disposed adjacent faces 25 and 31 and the outer ends of the springs may be bent to an angle approximately parallel to the axis of the coil springs 15 and 16 at a locus at approximately the outer diameter of the coil springs to register with respective apertures 33 and 7 and be retained therein. Position of the barrel aperture and disposition of the spring member ends will to some extent be determined by the torque input and the load. Fastened or secured to the inner end of output shaft 11 may be the disc 14 by a screw or other retaining means (not numbered), disc 14 being held approximately centered between the barrel faces 25 and 31 and in approximately axial relationship with respect to the barrel assembly by the action of the coil springs 15 and 16 on the flanges of washers 18 and 36. Coil 15 may be compressed between face 31 of barrel 3 and one face 30 of the disc 14 through the medium of the tapered portion or the flange of washer 36 and coil spring 16 may be compressed between the face 25 of barrel 4 and the other face 27 of clutch disc 14 through the medium of the tapered portion or of the flange of washer 18. Clutch disc 14 may be partially or wholly made with several suitable types of clutch facing material, and the clutch faces 30 and 27 may either be separate but integral with the body portion of disc 14 or the clutch disc 14 may be made of uniform material as desired. Inserted adjacent the faces 30 and 27 of clutch disc 14 and each of the springs 15 and 16 may be centering washers 36 and 18. Each centering washer 36 and 18 may have an outer diameter through a portion of its length approximately equal to the inner diameter of the respective spring 15 or 16 over which it is bearingly received and may have a flange respectively urged against the respective face 30 or 27 of clutch disc 14. By registry with and insertion of the spring end 17 of spring 16 in aperture 7 and the end 21 of spring 15 in aperture 33, the respective springs 15 and 16 may be retained in position with respect to clutch body or barrels 3 and 4 respectively. If desired, the springs may be also retained by barrels 3 and 4 by positive fastening means (not shown), and the spring ends may protrude through and beyond apertures 7 and 33. Centering washers 18 and 36 may be tapered on the outer circumferential surfaces thereof if desired or the outer circumference of washers 18 and 36 may optionally be of uniform diameter throughout the length of each of the washers. Washers 18 and 36 may be secured to clutch faces 27 or 30 or may be retained in abutting relation therewith by friction between the disc faces and the flanges and in axial alignment therewith.

In operation, rotation of motor shaft 8 may be transmitted through rotation of the clutch bodies or shell and of spring 16 therewith, the end of spring 16 adjacent washer 18 and clutch face 27 bearing thereagainst to cause rotation of clutch disc 14 to thereby cause output shaft 11 to rotate. Regardless of deviation within limits of spacing between the coils of springs 15 and 16 of output shaft 11 from that axial position aligned with the clutch body or shell portions 3 and 4 it may be seen that action of the spring member 15 will occur to rotate clutch disc 14 even though the disc and springs may be varied from position normal to the shell axis to thereby permit the output shaft 11 attached to disc 14 to thus vary within limits of a considerable amount (for example, 15°) from the clutch axis. Thus, despite pivoting of the center of the disc following longitudinal pivoting of the output shaft mechanical translation of motion of input shaft 8 will be accurately and positively imparted to output shaft 11.

Motor shaft 8 may be secured or fastened in engaging relationship with the male housing member 4 by fastening means such as a set screw (not shown) such that upon rotation of motor shaft 8 the entire housing 3, 4 will rotate with the motor shaft 8. The face 23 of motor shaft 8 may be spaced from the centering washer 18 and may, for example, be located within the aperture 26 in male body member 4 such that it is approximately aligned with the inner face 25 of male member 4. Thus, in an embodiment where clutch 14 is integral with the output shaft 11 or when, as in FIG. 1, it is directly fastened thereto, deviation off-center of the output shaft 11 within the limits permitted by aperture 10 of female clutch body 3 will cause some bending of axis of windings of the spring members 15 and 16. However, the inner face 28 of spring member 16 will remain parallel to the flange of washer 18 and corresponding face 27 of the clutch disc 14 and thus by reason of the face 28 of spring member 16 being constantly urged against the flange or the tapered outer surface of washer 18 and hence the clutch face 27 and by virtue of the fact that the entire body rotates with its secured motor shaft, the bearing pressure on face 27 caused by the spring member 16 acting through washer 18 will cause the clutch disc 14 to also rotate thereby causing the output shaft 11 which may be fastened or integral with the clutch disc 14 to be rotated a corresponding amount of radians.

That is, upon rotation of motor shaft 8, the entire clutch body comprising the male member 4 and the female member 3 will rotate. The end 17 of spring 16 being secured in the aperture 7 of male member 4 will thereby cause the spring member 16 to be rotated therewith. Inasmuch as the face 28 of spring member 16 is constantly urged against the washer 18 flange and hence clutch disc face 27, the clutch disc 14 will thereby rotate also causing the output shaft member 11 which may be attached thereto to rotate. Should output shaft member 11 become axially displaced temporarily or permanently, by intention as shown, for example, by the conical scanning of FIG. 3 and the cam axis interruption means of FIG. 4 or otherwise, the spring member 16 and the spring member 15 will accordingly compress and expand (deform) at required points so that the faces 28 and 29 of the respective spring members 16 and 15 will always be parallel to the corresponding faces 27 and 30 of clutch disc 14 and clutch disc 14 will have its longitudinal axis rotated accordingly. Thus, positive transmission will occur regardless of deviation of the output shaft 11 from its axis within the limits of expansion and compression of the turns of the coils. During any operation as heretofore indicated, the respective washers 18 and 19 will cause centering of the spring members 15 and 16 with respect to the disc because each of the washers has its shank portion inserted within the spring end to position the spring concentric with the shank of the washer and the spring end face bears against the flange of the washer which flange in turn is held in frictional forced engagement thereby in a position axially aligned and concentric with respect to the disc so that by the arrangement of two springs bearing in opposition directly on the washer flange and positioned on the washer shanks and the washers being disposed on either side of the disc, the whole makes a flexible yet positively positioned assembly between the shell ends. It will be understood, of course, that in one embodiment (not shown) the washers may be integral with or permanently affixed by appropriate securing members (not shown) to the faces 27 and 30 of clutch disc 14 or as shown the washers may be frictionally engaging but separate members. It should also be understood that the disc 14 will always be caused to rotate in response to rotation of motor shaft 8 and the entire shell comprising female clutch body member 3 and male clutch body member 4 because of the fixing of the ends of springs 15 and 16 respectively in the apertures 33 and 7. It should further be understood that the lock nut 5 will adjustably, but positively, retain the male and female clutch body members 3 and 4 in desired mating relationship to cause a predetermined or desired amount of tension on each of the springs 15 and 16. Should the tension on the springs be desired to be adjusted, the lock nut 5 may be rotated in a direction to cause translational motion toward or away from the motor shaft 8 end of the body member 4 and the clutch body members may then be threadedly further or lesser engaged with respect to each other until the spacing between clutch faces 25 and 31 is such that desired tension of the springs is achieved. At this point lock nut 5 may again be threaded until it bears upon the open ended face (not numbered) of clutch body 3 to maintain the clutch bodies 3 and 4 in the then desired mating relationship for proper spring tension and operation of the device.

Referring more particularly now to FIG. 2 wherein is shown the washer which in the embodiment of FIG. 1 bearingly engages the clutch 14 and retains its respective spring member 15 or 16 in position, washer 18 or 36 may comprise a gromet shaped body having a tapered outer surface 51, a flange 52 and may contain an aperture 53 to permit passage of the unnumbered screw member therethrough to retain the output shaft 11 fixedly secured to clutch disc 14. The washer 18 or 36 may be punched out and the aperture therethrough punched simultaneously or drilled in accordance with various manufacturing techniques. For the sake of standardization washers 18 and 36 may be identically manufactured.

Referring to FIG. 3, a means of constant predetermined deviation of the output shaft to provide conically scanning motion is shown. Here the output shaft 11' is caused to describe a conical scanning path by means of cone-shaped roller bearing 40. Roller bearing 40 may be suitably mechanically positioned and secured to be rolled around by rotating output shaft 11'. Such a device has many applications, for example, it could be used in a missile guidance system for scanning in the nose cone of a missile to sense a target, or it could be used in radar applications or for particular types of monochrome or color television scanning.

Referring to FIG. 4, a means for predetermined interrupted deviation of the output shaft is provided. Here cam member 54 may be suitably positioned and rotatably secured to force deviation of the output shaft 11" once each revolution. This will have such applications as for synchronizing, clocking or timing arrangements or to physically, or electrically or otherwise provide for flyback, for indexing, for counting, for range or time or position indication, or for other regularly occurring interval effects or indications. By providing different cams coded sequences or irregular or patterned sequences may occur. This will also have such applications as permitting interval keying of a transmitter or other circuit.

The inventive concept is, of course, not limited to driving by a motor shaft. For example, a core driving member or other member having a threaded inner aperture could be permanently affixed to the outer thread diameter of male clutch body 4 to cause the male clutch body to rotate therewith. Methods other than threading at the ends might be utilized, for example, a driving member other than shaft 8 might be disposed around the outer circumference of clutch body 4 with clutch body 4 having a permanently positioned axis in various conventional ways. Similarly rotation might be imparted by a protrusion or a pin extending from the face 12 of clutch body 4 and a means to rotate the clutch body member 4 intermittently, constantly or at variable speeds might be instituted to thereby cause rotation of the entire assembly and cause the output shaft 11 to rotate therewith regardless of deviation of the output shaft 11 from aligned position with respect to the clutch bodies. Similarly a pawl and ratchet type of movement could be inserted adjacent the face 12 or otherwise positioned on either one of the clutch bodies 3 or 4 to cause rotation of the clutch body yet insure that motion can be effected of the output shaft 11 despite deviation from aligned axis with the clutch body. Similarly by means of a hand wheel or crank member affixed to face 12 or 9 or by appropriate roller bearing relationship at any point with respect to the clutch bodies 3 and 4 the clutch bodies can be rotated to impart motions to the output shaft 11. Also as long as the shell is positioned in space and shaft 8 is permitted to deviate therefrom or vice versa, drive might be imparted by gearing in which case the shell may be shaped to provide a spur or a bevel gear pinion arrangement or the shell might be the end gear or roller positioned by and also driven by the remainder of a differential system.

For optimum operation or for operation permitting the output shaft 11 to deviate despite non-deviation of the clutch body, maintaining of aligned position of the clutch bodies 3 and 4 is desirable to permit the output shaft to deviate therefrom. Most applications may therefore require that the clutch face 12 be retained in the same plane either by affixation to a fixedly mounted rotating body or by other means permitting rotation while maintaining the planar relationship in order that the shaft 11 may deviate therefrom and proper spring action may take place. It is not precluded, however, that in some applications the entire clutch body may be desired to be rotated or revolved about a plane and that the output shaft will be correspondingly rotated or revolved except that it may deviate from the axis of the clutch body without affecting adversely the transmission of motion from the driving body through the clutch disc to the output shaft or other driven device.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A clutch and flexible shaft coupling comprising a first and a second clutch body member disposed in axial engaging relationship to form a shell, each of said clutch bodies having a closed face and an open face, said closed faces being disposed on opposite ends of said shell, said first and said second clutch body closed end face each having an axially aligned aperture extending therethrough, an output shaft disposed selectively concentric with and deviating at an angle from the axis of said clutch bodies and in said second clutch body aperture, said shaft being of substantially smaller diameter than the diameter of said second body aperture to permit off-axis deviation of said shaft within said second body aperture, means constantly aligned in fixed relation to said shell to provide driving torque thereto, first spring means and second spring means axially aligned with respect to each other in laterally undeformed substantially concentric condition with respect to the axis of said shell, a clutch disc disposed in normal relationship to the axis of said shell and between said first and said second spring means in said laterally undeformed condition of said springs, said output shaft being secured to one face of said clutch disc and being inserted concentrically within said second spring member, said second spring means having a larger inside diameter than the outer diameter of said output shaft, said springs being constantly urged in a direction against the faces of said clutch disc and secured to respective ends of said shell to cause motion transmitted to said shell to be applied by said springs to said output shaft despite deviation from aligned axis of said shell by said output shaft each of said springs being coiled to permit deformation of adjacent spring turns upon shaft deviation such that the end of each of said springs facing said clutch body closed ends is in adjacent substantially coplanar relationship with said closed end and each of the ends of each of said springs adjacent the clutch disc is at an angle with respect to the clutch body axis.

2. A flexible shaft coupling comprising a shell body, a first coil spring member longitudinally disposed within said shell body, a second spring member longitudinally and substantially axially disposed with respect to said first spring member, said coil springs being tensioned in opposing relationship to constantly urge said springs toward each other, a disc member disposed between said first and said second spring and being constantly centered with respect to the longitudinal space in said shell under tension from said springs, said shell being apertured at one end thereof, an output shaft extending through a portion of said shell member and affixed to said clutch disc and extending through said shell aperture, said shell aperture being larger than the diameter of said output shaft to permit angular and lateral deviation from axis of said output shaft, said springs being flexible and secured to said shell to provide transmission of force imparted to said shell to said output shaft despite deviation from aligned axis by said output shaft.

3. A combination clutch and flexible shaft coupling assembly, said assembly comprising a shell member, means to rotate said shell member, said shell being closed at one end thereof and having an aperture through said closed end, said aperture being disposed around the longitudinal axis of said shell, an output shaft extending through said shell end aperture, a clutch disc member and a pair of helical springs each of said helical springs having an end secured in said shell and having its other end in position to cause stress against a respective face of said clutch disc, said output shaft extending along an inside portion of said first helical spring, said output shaft being secured to said clutch disc whereby upon rotational motion of said shell said springs will cause said clutch disc to rotate to thereby cause said output shaft to rotate, said output shaft being of a diameter smaller than said shell aperture so that deviation of said output shaft from an axis aligned with said shell axis may be effected, compression and expansion of said spring members being caused upon such deviation to permit such deviation to be made without appreciable loss of transmission power from said springs to said disc member.

4. A combination clutch and flexible coupling assembly, said assembly comprising an input motor shaft, a shell member having a pair of closed end faces, one of said faces containing an aperture therethrough to fixedly retain said motor shaft to thereby permit said shell to be rotated with the rotation of said motor shaft, a first helical spring member having one end secured to said shell so that said spring member will rotate with said motor shaft and said shell body, a second spring member having one end secured to said shell and approximately aligned with said first spring member and in opposed relationship thereto, a clutch disc having at least one point on its axis located in proximity to the axis of said shell member and disposed between the unattached ends of said springs, said second shell face having an aperture therethrough to receive an output power transmission means, said aperture being of greater diameter than said output power transmission means to allow off-axis deviation of said power transmission means, said helical spring member having spaced adjacent turns such that off-axis deviation to preferred limits of contiguous relationship of adjacent turns may be effected with efficient transmission, one end of said output power transmission means being secured to the clutch disc face and disposed through at least a portion of one of said springs, so that upon rotation of said motor shaft, said shell body and attached springs will rotate to thereby drive said clutch disc to rotate, said output transmission means because of its being affixed to said clutch disc thereby causing said output shaft to rotate with rotation of the clutch disc.

5. A coupling for imparting motion to an output shaft comprising a washer member, clutch means affixed to said output shaft, said washer being axially aligned with said clutch and contiguous thereto, a first coil spring disposed in contiguous relationship with said washer to constantly urge said washer against one face of said clutch disc, a second coil spring and a second washer in opposed relationship to said first spring and said first washer, one end of said second spring being constantly urged through said second washer against the other face of said clutch disc, a body member to which said first spring and said second spring have its other ends permanently secured, said body member partially surrounding said output shaft but spaced therefrom to permit deviation of said output shaft with respect to the axis of said body member, means to constantly position the axis of body member, said second spring and said first spring upon rotating being constantly urged in a direction against said clutch disc face to impart rotation thereto despite the angular position of the output shaft within limits of compression and expansion of said coil springs.

6. Transmission means comprising a male and a female clutch body member, each member having an inner end face, the body members being disposed in mating relationship to thereby form a shell having a pair of opposite inner face members, means to effect translational movement of said male clutch body member with respect to said female clutch body member to thereby provide adjustment of the size of said shell, means to retain said face members in predetermined adjusted relationship to determine the spacing of the end walls of the shell from each other, a first coil spring member having a first end secured to said male clutch body member and a second coil spring member having a first end secured to said female clutch body member, said springs being in approximately axial relationship with respect to each other and the shell and having outer diameters less than the inner diameters of said clutch body members to which said springs are attached, a disc member disposed between the unattached ends of said springs, said disc member having faces constantly under compression between said spring members, a first washer abutting one face of said clutch disc and having a surface of diameter to fit in said first spring and a second washer abutting the other face of said clutch disc and having a surface of diameter to fit inside of said second spring to thereby center said spring members, an output shaft, means to secure said shaft to said clutch disk, said output shaft rotating upon rotation of said clutch disc, and means to drive said shell to thereby impart rotation to said output shaft, one of said clutch body members being apertured to receive said output shaft, said output shaft extending through the face of said one of said body members, said aperture being of diameter with relation to said output shaft diameter size so that said output shaft has sufficient play in said aperture to be axially misaligned within limits to thereby cause transmission to be imparted from said shell to said output shaft through said clutch disc despite deviation of the output shaft within limits effected by the spacing between the spring coil windings.

7. The apparatus of claim 6 wherein said means to drive said shell comprises a rotatable motor shaft, means to secure said motor shaft to said shell, said motor shaft being affixed to said shell member by said securing means.

8. The apparatus of claim 7 wherein said motor shaft and said output shaft are substantially axially aligned with the axis of said first and said second spring members, respectively, and are of smaller diameter than said spring members so as to be inserted within said spring members along a portion of the length of each of said shafts, the other of said clutch bodies being apertured, said motor shaft at least partially extending through said last-named aperture.

9. The apparatus of claim 8 wherein said male and female clutch bodies each has an aperture spaced from its respective axis and penetrating into its respective inner end face, said first end of said first coil spring member being secured into said male clutch body inner face aperture, said first end of said second coil spring member being secured into said female clutch body inner face aperture; said face aperture and coil spring end engagements constituting said first and second spring securing means, said spring securing means permanently affixing each of said springs to cause rotation of said first spring upon rotation of said shell thereby causing said clutch disc to rotate and causing said output shaft to rotate.

10. A clutch mechanism comprising an approximately cylindrical body having ends, means to rotate said body, a first and a second coil spring, one end of each spring being affixed respectively to one end of said body, a clutch member disposed between said springs and an output shaft secured axially to said clutch member, and circumferentially, one of said springs longitudinally enclosing said output shaft along a portion of the output shaft length, one end of said cylindrical body being apertured to permit said output shaft to extend therethrough, said shaft diameter being smaller than said aperture diameter to permit off-axis deviation of said output shaft, compression and expansion of said spring members being caused upon such deviation to permit transmission of power to said output shaft to thereby provide rotation of said output shaft despite output shaft off-axis deviation.

References Cited in the file of this patent

UNITED STATES PATENTS

| | | |
|---|---|---|
| 981,869 | Miller | Jan. 17, 1911 |
| 1,310,021 | Johnson | July 15, 1919 |
| 1,331,748 | Fisker | Feb. 24, 1920 |
| 1,640,894 | Hebert et al. | Aug. 30, 1927 |
| 1,820,442 | Cooper | Aug. 25, 1931 |
| 2,371,855 | Sunderland | Mar. 20, 1945 |
| 2,475,386 | Frisco | July 5, 1949 |

FOREIGN PATENTS

| | | |
|---|---|---|
| 431,902 | Italy | Mar. 8, 1948 |